(12) United States Patent
Couch

(10) Patent No.: US 7,018,536 B2
(45) Date of Patent: Mar. 28, 2006

(54) AEROBIC WASTEWATER MANAGEMENT SYSTEM, APPARATUS, AND METHOD

(75) Inventor: Weldon Couch, Florence, TX (US)

(73) Assignee: Proline Wastewater Equipment, LLC, Florence, TX (US)

( * ) Notice: Subject to any disclaimer, the term of this patent is extended or adjusted under 35 U.S.C. 154(b) by 0 days.

(21) Appl. No.: 11/035,209

(22) Filed: Jan. 13, 2005

(65) Prior Publication Data

US 2005/0126995 A1 Jun. 16, 2005

Related U.S. Application Data

(63) Continuation-in-part of application No. PCT/US03/12522, filed on Apr. 25, 2003.

(51) Int. Cl.
*C02F 3/00* (2006.01)

(52) U.S. Cl. ............... 210/622; 210/623; 210/195.1; 210/197; 210/532.2

(58) Field of Classification Search ............ 210/195.1, 210/197, 620, 629, 623, 622, 220, 532.2
See application file for complete search history.

(56) References Cited

U.S. PATENT DOCUMENTS

| 3,713,543 A | 1/1973 | Heaney |
| 3,837,494 A | 9/1974 | Stevenson |
| 4,092,249 A * | 5/1978 | La Gatta ............... 210/195.1 |
| 5,454,949 A | 10/1995 | Davis |
| 5,484,524 A | 1/1996 | MacLaren et al. |
| 5,647,986 A | 7/1997 | Nawathe et al. |
| 5,667,689 A | 9/1997 | Graves |
| 5,674,399 A | 10/1997 | Davis |
| 6,123,846 A | 9/2000 | Kikuchi |

FOREIGN PATENT DOCUMENTS

WO  WO 99/272205  6/1999

* cited by examiner

*Primary Examiner*—Chester T. Barry
(74) *Attorney, Agent, or Firm*—Bracewell & Giuliani LLP

(57) ABSTRACT

A wastewater processing and treatment system utilizes aerobic bacteria in two separate compartments to break down and digest waste. The first settling compartment between the trash tank and the mix liquor compartment is non-existent in conventional aerobic units. The first settling compartment allows for settling of heavy particles and keeps floating debris out of the circulating pump that is located in the mix liquor compartment. In the mix liquor compartment, 100% of the liquid is blended with air several times per hour to increase the efficiency and performance of the unit. The pump intakes on the bottom of the mix liquor compartment allow the pump to remove sludge build-up.

20 Claims, 7 Drawing Sheets

AEROBIC WASTEWATER MANAGEMENT SYSTEM, APPARATUS, AND METHOD

RELATED APPLICATIONS

The present patent application is a continuation-in-part patent application based on International Patent Application No. PCT/US03/12522, entitled, *Aerobic Wastewater Management System and Method*, filed Apr. 23, 2003, which is incorporated herein by reference.

BACKGROUND OF THE INVENTION

1. Technical Field

The present invention relates in general to an improved system for processing wastewater, and in particular to an improved aerobic system and method for processing and managing wastewater effluent.

2. Description of the Related Art

The treatment of wastewater, whether for purposes of recycling or prior to its discharge into treatment works, rivers, lakes, groundwater suppliers, etc., is an ever-increasing problem. To date, three general classes of methods for removing contaminating organic substances from wastewater, such as sewage, have been developed. These are chemical treatments, biological treatments, and physical treatments.

Biological treatments have been used in a wide variety of applications. Generally, the treatment involves contacting wastewater with a consortium (community) of microorganisms that utilize dissolved organic substances as nutrients. During the biological treatment, three main activities occur: reduction of biological oxygen demand (B.O.D reduction), nitrification and denitrification of the organic waste. All three processes are affected by bacteria, the former two—by aerobic bacteria, and the latter—by anaerobic (anoxic) bacteria.

In the various reactors for biological treatment of sewage, mutual disposition of the biological activities in the overall treatment may be different in that the denitrification stage may be performed before, concurrently or after B.O.D. reduction. When denitrification is performed before B.O.D. reduction and nitrification, this may take place either in a separate reactor or in the area of the main reactor where the raw sewage enters. When denitrification is performed after B.O.D. reduction and nitrification, the system typically requires its supplementation with an additional source of carbon, such as methanol, in order to effect denitrification. When denitrification, B.O.D. reduction and nitrification occur concurrently, in a so called combined system, this system typically comprises alternating aerobic and anaerobic stages in which incremental reduction in the organic carbon and nitrogen content of the sewage is accomplished in each stage. This enables the system to maintain the organic carbon after the B.O.D. reduction stages at a sufficient level for denitrification without adding an additional source of carbon. Systems of this type are disclosed, for example, in U.S. Pat. Nos. 3,994,802; 3,945,918; 4,279,753; 4,564,457 and 4,374,730.

Typically, the combined systems for biological treatment of sewage hitherto known are designed to include the use of aeration and/or agitation means during the aerobic stage of the treatment for the purpose of reduction of the time required for nitrification. Nearly all prior art sewage purification systems require that sooner or later the system be closed down to allow removal of sludge that has not been fully treated and has accumulated in the processing vessels. Large municipal treatment plants have the equipment and personnel to carry out this work. However, small-scale systems intended for the use of a single house or housing blocks are better served by arrangements that almost completely dispose of organic solids and so do not require such servicing.

Methods and apparatus for treating domestic effluents are disclosed in U.S. Pat. No. 4,172,034 (Carlsson, et al); U.S. Pat. No. 4,812,237 (Cawley); U.S. Pat. No. 5,114,586 (Humphrey) and U.S. Pat. No. 5,342,523 (Kuwashima). Carlsson describes an apparatus, which operates on an easy-flowing slurry, having a dry solids content of between 1–15%, preferably 5–10%. Such a dilute slurry unnecessarily extends processing time to achieve aerobic degradation in a reaction vessel with aeration; however, the Carlsson apparatus has the advantage of being compact.

Humphrey discloses a complex sanitation system provided with many vessels, five of which have multiple air entry orifices. The resulting high air consumption necessitates the installation of a large air blower or compressor, leading to high running costs and a noise suppression problem. Another difficulty encountered in the Humphrey system is finding space in a residential building for all the described system components.

Cawley describes and claims a process for purifying and recycling household wastewaters, comprising the steps of (a) collecting a first wastewater stream from household kitchen sources; (b) anaerobically digesting said first wastewater stream in a first septic tank; (c) collecting a second wastewater stream from household laundry and bathing sources; (d) combining water from steps (b), (c) and (h); (e) anaerobically digesting water from step (d) in a second septic tank; (f) pumping water from step (e) over a biological sand filter under aerobic conditions; (g) pumping biologically filtered water from step (f) through an ultra-filter, thereby separating the biologically filtered water into a retentate stream and a permeate stream; (h) returning said retentate stream to step (d); (i) disinfecting said permeate stream; (j) returning a first portion of said disinfected permeate stream to household laundry and bathing facilities; (k) separating a second portion of said disinfected permeate stream into a low salt portion and a high salt portion; (l) returning said low salt portion to a household kitchen; and (m) disposing of said high salt portion.

Kuwashima proposes a pair of separator tanks, which are used alternately for separating floating or sedimenting material; the organic material is transferred for aerobic decomposition to a third tank. The device lacks means for breaking up large solids into small particles for efficient decomposition. Although each of these prior art designs are workable, a more effective and efficient means of treating wastewater and sewage would be desirable.

SUMMARY OF THE INVENTION

One embodiment of a wastewater processing and treatment system constructed in accordance with the present invention utilizes aerobic bacteria in two separate compartments to break down and digest waste. This system is much more efficient than those that use the much slower acting anaerobic bacteria. The first settling compartment is nonexistent in conventional aerobic units. The first settling compartment allows for settling of heavy particles and keeps floating debris out of the pump that is located in the mix liquor compartment. In one embodiment of the invention, 100% of the liquid is blended with air several times per hour in the mix liquor compartment, again tremendously increasing the efficiency and performance of the overall unit. The pump intakes at the bottom of the mix liquor compartment allow the pump to remove sludge build-up, which is a significant problem on all other conventional aerobic treatment units. No particles of a significant size can remain in the mix liquor compartment without being blended with air.

As the effluent is blended with air, oxygen is separated from the other gases in the air. Oxygen, being heavier than H20, settles to the bottom of the tank. This concentration of oxygen, as high as 90% dissolved, inhibits the development of sludge at the bottom of the tank. Sludge is generally made of organic particles that settle to the bottom and anaerobic bacteria. The oxygen present in the bottom of the tank allows the aerobic bacteria to multiply and consume the organic particles and the anaerobic bacteria. Therefore the present aerobic unit will have a minimal amount of sludge build up.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and therefore are not to be considered limiting of its scope as the invention may admit to other equally effective embodiments.

DETAILED DESCRIPTION OF THE INVENTION

Figure 1:
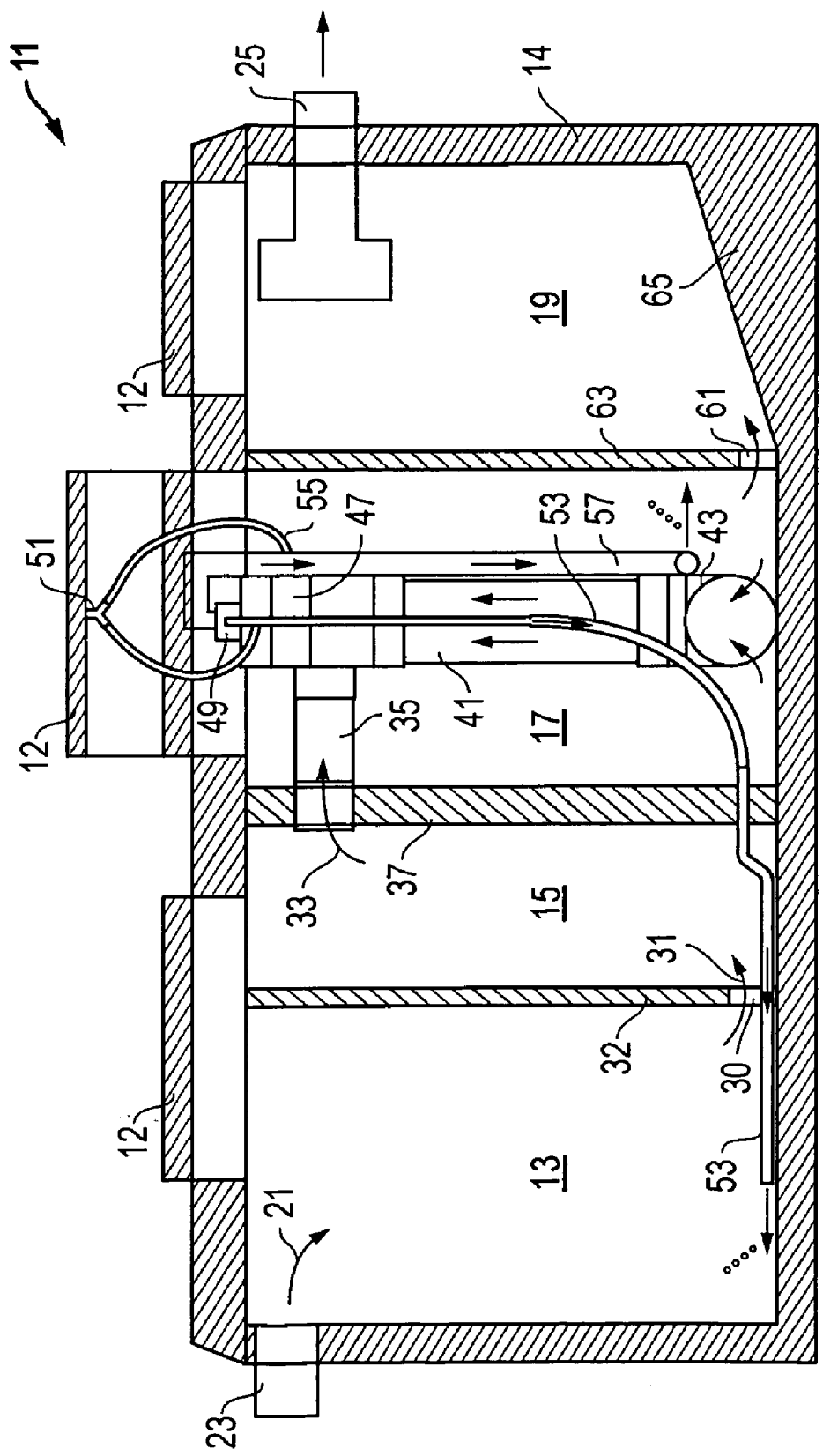
FIG. 1 is a sectional side view of a first embodiment of an aerobic wastewater management system constructed in accordance with the present invention.
Figure 2:
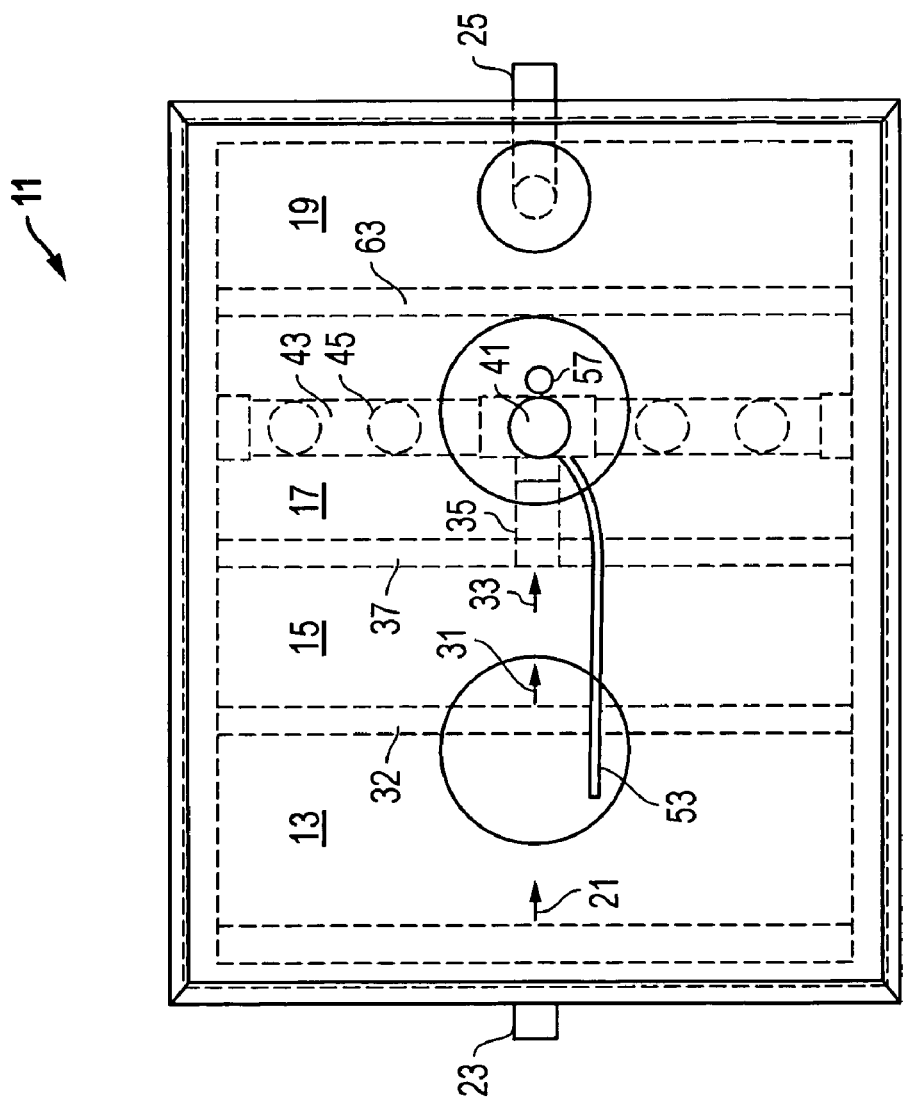
FIG. 2 is a top view of the system of FIG. 1.

Referring to FIGS. 1 and 2, a first embodiment of an aerobic wastewater management system 11 constructed in accordance with the present invention is shown. System 11 comprises a generally rectangular tank 14 (e.g., a septic tank) having four side walls, a bottom, and a top with resealable access ports 12. The tank 14 also has four compartments 13, 15, 17, 19, and each compartment is separated by partitions that are located within tank 14. Wastewater or sewage, indicated by arrow 21, enters system 11 at entry port 23 in a conventional manner and generally flows left to right as it is processed and bio-nutrients are removed, until reclaimed water is produced and exits system 11 at exit port 25. The discharge is then distributed in a conventional manner.

As wastewater 21 enters system 11 via attached plumbing (not shown), it contains both organic matter and human waste, which is also known as effluent. The effluent is deposited through entry port 23 directly into the first compartment, or trash tank 13. In trash tank 13, the effluent is initially processed and broken down into suspended solids and liquids, which are partially digested by aerobic bacteria (not shown). Aerobic bacteria, rather than the much slower acting anaerobic bacteria, is used to break down and digest the waste.

The separated sewage (indicated by arrow 31) from trash tank 13 migrates and enters into the second compartment, which is a first settling compartment 15, via an opening 30 at the bottom of the first partition 32. In first settling compartment 15, all heavier solids settle out of the liquid and remain in compartment 15. These solids then continue to undergo digestion by the aerobic bacteria located in compartment 15. The lighter solids, which are still suspended in the liquid (indicated by arrow 33), exit compartment 15 through a horizontal tube 35 located at the top of the second partition 37.

Tube 35 delivers its contents into a vertical pipe 41, which is located in the third compartment, or the mix liquor compartment 17. A horizontal base pipe 43 is interconnected to the lower end of vertical pipe 41 to form a T-shaped union. As shown in FIG. 2, base pipe 43 rests on the floor of mix liquor compartment 17 and generally extends from side wall to side wall inside mix liquor compartment 17 of system 11. Base pipe 43 has a plurality of apertures 45 that face the floor of compartment 17. Ideally, there are four symmetrically spaced-apart apertures 45 in base pipe 43. The design of this intake system contributes to prevent an accumulation of sludge at the bottom of mix liquor compartment 17, such that only a very small residual amount of sludge (approximately 2% or less by volume in the mix liquor compartment, in one embodiment) is ever present in compartment 17. This is a very significant improvement over prior art systems, which typically have a sludge presence of approximately 20%.

A pump 47 is located at the upper end of pipe 41 and draws in all liquids and suspended solids from within compartment 17 and tube 35. The contents of compartment 17 circulate up through apertures 45 into pipe 41 and pump 47. Pump 47 circulates the liquids and suspended solids through a spin filter 49 to further separate any solids larger than 200 microns. Air is blended into the filtrated liquid and suspended solids via an air intake device 51 wherein they are thoroughly blended with air that has been drawn from the ambient atmosphere outside of system 11. A portion (approximately 30% in one embodiment) of this blended mixture of suspended solids, liquid, and air, also known as aerated precipitate, is discharged into the trash tank 13 via a hose 53. The introduction air into trash tank 13 via hose 53 facilitates the growth of aerobic bacteria that digests organic solids, as described above.

The remaining portion of the filtered flow from the spin filter 49, which was not discharged into trash tank 13, is then thoroughly blended with air via a second air intake device 55, which again is drawn from outside the system 11. This blend of liquid, suspended solids, and air, also known as the aerated filtrate, is discharged back into the mix liquor compartment 17 through a tube 57. The introduction of air into compartment 17 via tube 57 facilitates the growth of aerobic bacteria that digests organic material, again virtually eliminating the presence of sludge in compartment 17.

All of the liquid and suspended solids in mix liquor compartment 17 are continuously pulled into pump 47 from the bottom of compartment 17 and circulated with air from the air intake device 51, thereby blending with air several times per hour. This process of mixing aerobic bacteria, air, and effluent increases the bacterial digestion of the organic solids. By drawing the liquid and solids from the bottom of compartment 17, forcing them through the spin filter 49, and aeration, the build-up of sludge in compartment 17 is eliminated.

After being processed through trash tank 13, first settling compartment 15, and mix liquor compartment 17, the biological oxygen demand (BOD) and total suspended solids (TSS) have been reduced to a level that is safe for discharge from system 11. The liquid flows from the bottom of compartment 17, through an opening 61 in partition 63, and into a second settling compartment or stilling compartment 19. If any heavy particles remain in the liquid, they will settle out in this compartment and return to compartment 17 by gravity feed via incline 65, where they will be re-introduced into the treatment process through base pipe 43. Once any heavier particles have settled, the liquid then exits the system 11 at the top of stilling compartment 19 through outlet port 25.

Two features of this embodiment of the present invention are (1) the maintenance of a high level of oxygen content in two of the compartments (trash tank 13 and mix liquor compartment 17), and (2) the virtually complete elimination of sludge in mix liquor compartment 17. Because of these significant advantages, the overall size of system 11 is much smaller than conventional wastewater processing and treatment devices. System 11 is buried in earth at a depth of approximately 46 inches. This depth is approximately 36 inches less than conventional units and offers a significant savings in earth excavation costs.

Figure 3:
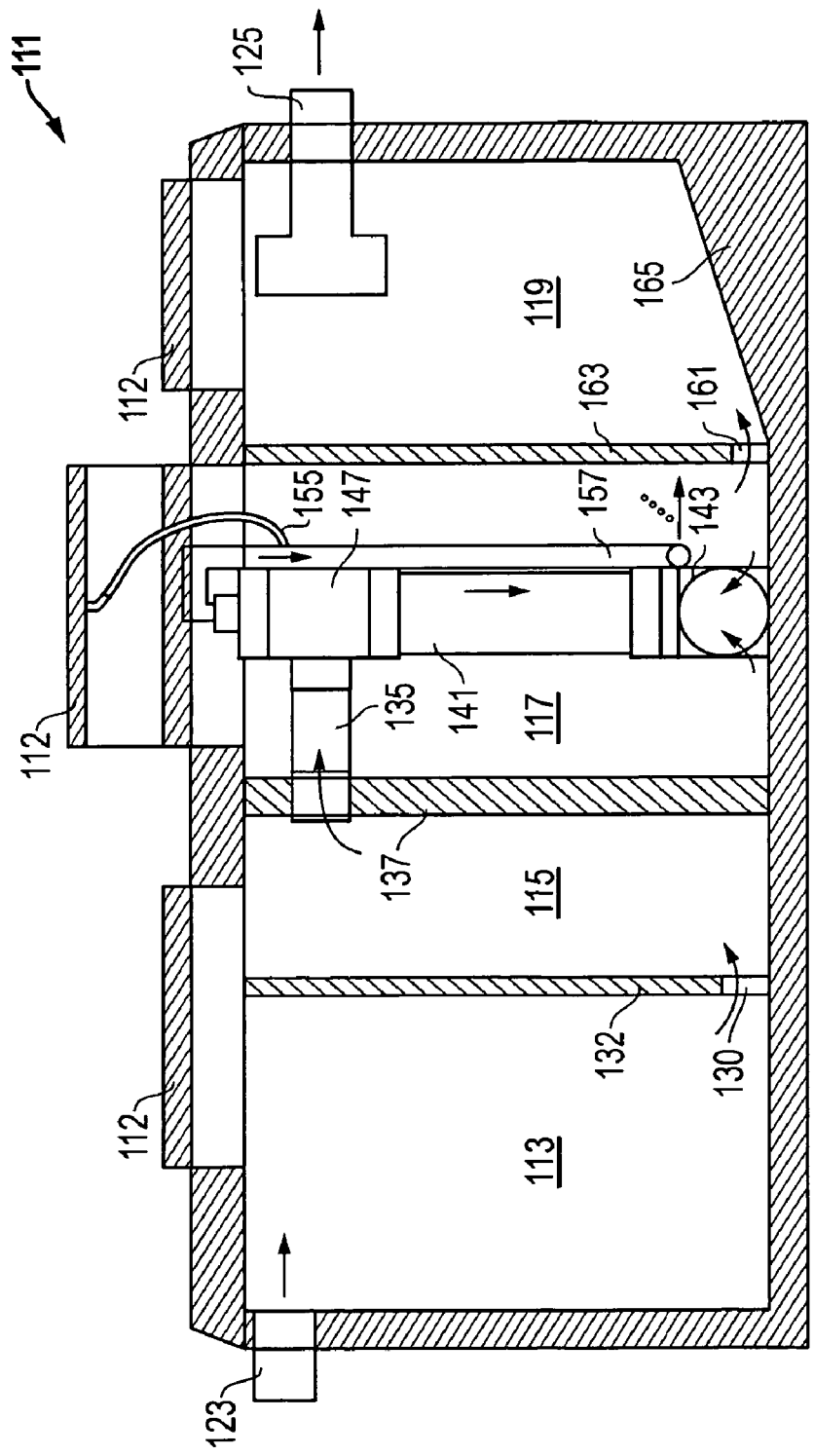
FIG. 3 is a sectional side view of a second embodiment of an aerobic wastewater management system constructed in accordance with the present invention.

Referring now to FIG. 3, a second embodiment of an aerobic wastewater management system 111 constructed in accordance with the present invention is shown. System 111 is very similar to the previously described system 11, except for two variations: system 111 does not have a spin filter, and there is no aeration in trash tank 113. Instead, system 111 blends air into the unfiltrated liquid and suspended solids via a single air intake device 155 wherein they are thoroughly blended with air that has been drawn from the ambient atmosphere outside of system 111. No portion of this blended mixture of suspended solids, liquid, and air, also known as aerated precipitate, is discharged into the trash tank 113. Instead, all of the aerated precipitate is discharged back into the mix liquor compartment 117 through a tube 157. The introduction of air into compartment 17 via tube 57 facilitates the growth of aerobic bacteria that digest organic material, which virtually eliminates the presence of sludge in compartment 117. The other elements of system 111 work in the same manner as those described above for system 11.

Figure 4:
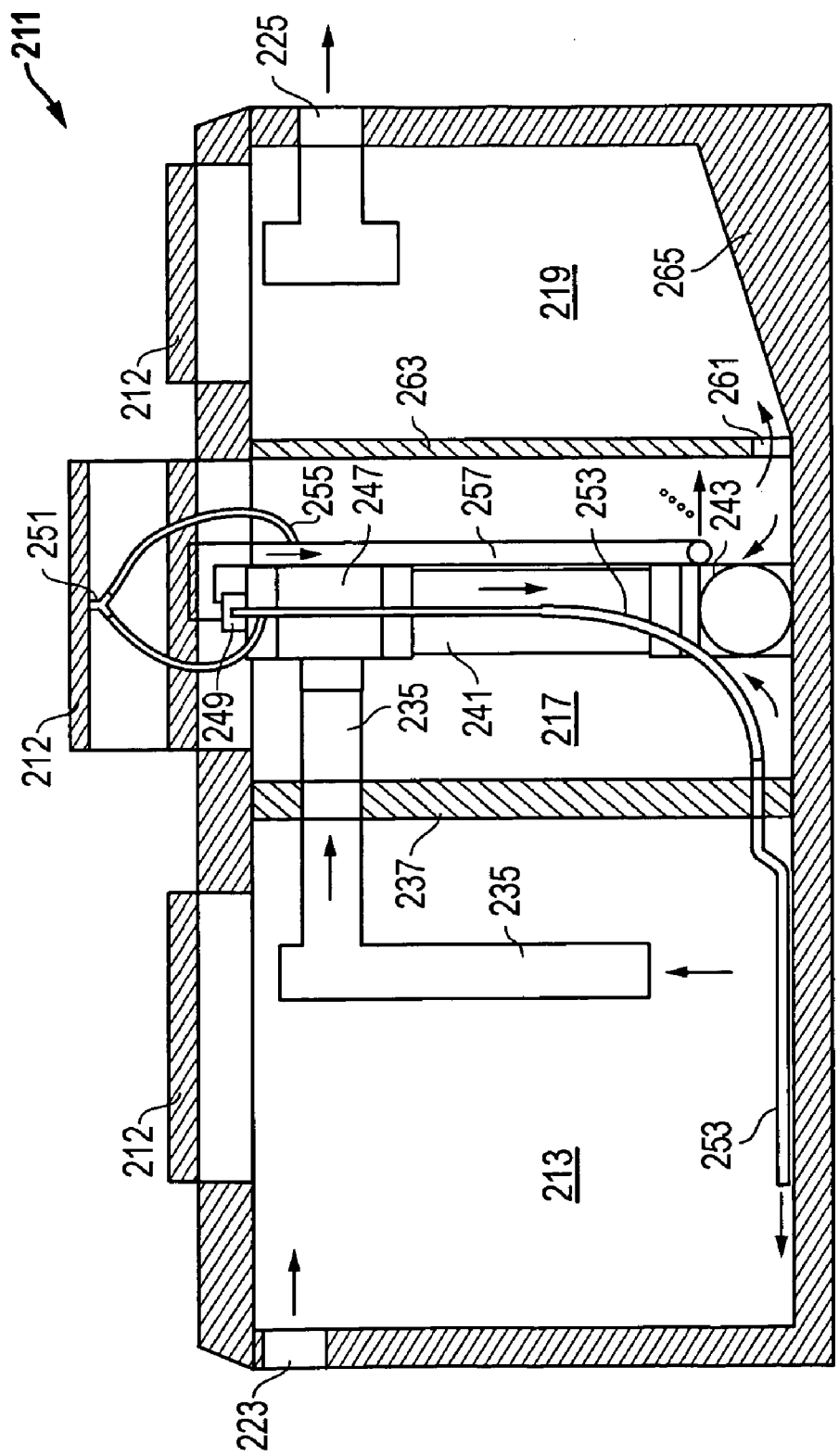
FIG. 4 is a sectional side view of a third embodiment of an aerobic wastewater management system constructed in accordance with the present invention.

Referring now to FIG. 4, a third embodiment of an aerobic wastewater management system 211 constructed in accordance with the present invention is shown. System 211 is most similar to the previously described system 11, except for one variation: system 211 does not have a first settling compartment between its trash tank 213 and its mix liquor compartment 217. Instead, system 211 draws effluent directly from trash tank 213, via an elongated tube 235 with a vertical conduit extending from the lower end of trash tank 213, directly into pipe 241 and pump 247. The other elements of system 211, including the pumping, circulation, aeration, and discharge, work in the same manner as those described above for system 11.

Figure 5:
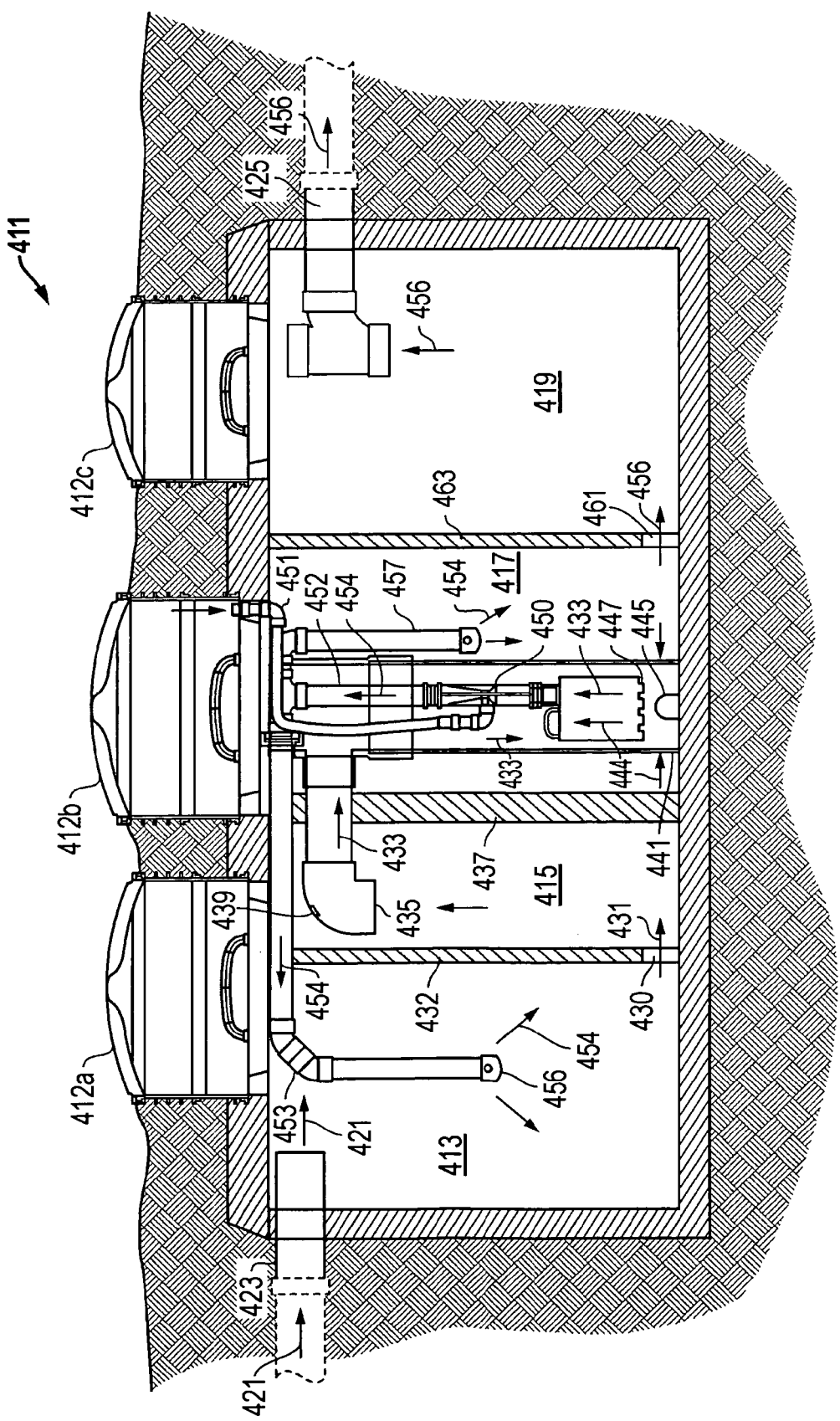
FIG. 5 is a sectional side view of a fourth embodiment of an aerobic wastewater management system constructed in accordance with the present invention.

Referring now to FIG. 5, a fourth embodiment of an aerobic wastewater management system 411 constructed in accordance with the present invention is shown. System 411 comprises a generally rectangular tank 414 with four compartments 413, 415, 417, 419. Each compartment is separated by walls or partitions that are located within the tank 414. Three resealable risers or access ports 412*a, b, c* are located on top of the tank 414. Port 412*a* provides access to compartments 413 and 415, port 412*b* provides access to compartment 417, and port 412*c* provides access to compartment 419. Wastewater or sewage, indicated by arrow 421, enters system 411 at entry port 423 in a conventional manner and, as depicted in FIG. 5, generally flows from left to right as it is processed and bio-nutrients are removed, until reclaimed water is produced and exits system 411 at exit port 425. The discharge is then distributed in a conventional manner.

As wastewater 421 enters system 411 via attached plumbing (not shown), it contains both organic matter and human waste, which is also known as effluent. The untreated effluent is deposited through entry port 423 directly into the first compartment, or trash tank 413. In trash tank 413, the effluent is initially processed and broken down into suspended solids and liquids, which are partially digested by aerobic bacteria (not shown). Aerobic bacteria, rather than the much slower acting anaerobic bacteria, are used to break down and digest the waste.

The separated sewage (indicated by arrow 431) from trash tank 413 migrates and enters into the second compartment, which is a first settling compartment 415, via an opening 430 at the bottom of the first partition 432. In first settling compartment 415, all heavier solids settle out of the liquid and remain in compartment 415. These solids then continue to undergo digestion by the aerobic bacteria located in compartment 415. The lighter solids, which are still suspended in the liquid (indicated by arrow 433), exit compartment 415 through a conduit 435 located near the top of the second partition 437. In the embodiment shown, conduit 435 comprises a horizontal pipe with a 90 degree elbow on one end that protrudes down into the first settling compartment 415. An air hole 439 is formed in the elbow of conduit 435.

Conduit 435 delivers its contents into a reservoir 441 (e.g., a large vertically-oriented pipe), which is located in the third compartment, or the mix liquor compartment 417. An optional horizontal base pipe (not shown, but described above in a previous embodiment) may be joined to the lower end of 441 to form a T-shaped union. Reservoir 441 (and/or the base pipe) has a plurality of apertures 445 that face the floor of the mix liquor compartment 417. The design of this intake system contributes to prevent an accumulation of sludge at the bottom of mix liquor compartment 417, such that only a very small residual amount of sludge (approximately 2% or less by volume of the mix liquor compartment, in one embodiment) is ever present in mix liquor compartment 417.

A pump 447, such as a centrifugal pump, is located inside the reservoir 441 near its lower end adjacent to apertures 445. Typically, electrical power is provided to system 411 through riser 412*b*. Pump 447 draws in all liquids and suspended solids (indicated by arrows 444) from the bottom of mix liquor compartment 417 and the liquid 433 from conduit 435. The contents 444 of mix liquor compartment 417 circulate through apertures 445 into reservoir 441 and up through pump 447. Pump 447 circulates the liquids and suspended solids 433, 444 through an aeration device 450, such as a venturi aeration device. Air is thoroughly blended into the liquid and suspended solids to produce oxygenated effluent (indicated by arrows 454). An air intake device 451 is provided for supplying oxygen to the aeration device 450. In one embodiment, air intake device 451 comprises a hose that extends from port 412b down into reservoir 441 and to aeration device 450 to provide air that has been drawn from the ambient atmosphere outside of system 411.

The oxygenated effluent 454 of suspended solids, liquid, and air, also known as aerated precipitate, flows out of aeration device 450 into a pipe 452 that is also located within reservoir 441. A portion (approximately 30%, in one embodiment) of the oxygenated effluent 454 is discharged into the trash tank 413 via a conduit 453. The introduction of air into trash tank 413 via conduit 453 facilitates the growth of aerobic bacteria that digests organic solids, as described above.

The bulk of the oxygenated effluent 454 flowing through pipe 452 (which was not discharged into trash tank 413) is discharged back into the mix liquor compartment 417 through a conduit 457. The introduction of air into compartment 417 via conduit 457 facilitates the growth of aerobic bacteria that digests organic material, again virtually eliminating the presence of sludge in compartment 417. In one embodiment, the ends of both conduits 453, 457 are capped but have a plurality of small nozzles to discharge the oxygenated effluent 454 into their respective compartments 413, 317.

All of the liquid and suspended solids in mix liquor compartment 417 are continuously pulled into pump 447 from the bottom of compartment 417 and circulated with air from the air intake device 451, thereby blending with air several times per hour. This process of mixing aerobic bacteria, air, and effluent increases the bacterial digestion of the organic solids. By drawing the liquid and solids from the bottom of compartment 417 and aerating them, the build-up of sludge in compartment 417 is eliminated.

After being processed through trash tank 413, first settling compartment 415, and mix liquor compartment 417, the biological oxygen demand (BOD) and total suspended solids (TSS) in the solution or treated effluent (indicated by arrow 456) have been reduced to a level that is safe for discharge from system 411. The treated effluent 456 flows from the bottom of compartment 417, through an opening 461 in partition 463, and into a second settling compartment or stilling compartment 419. If any heavy particles remain in the liquid, they will settle out in this compartment, which, optionally, may be provided with an incline (not shown) as described above for the previous embodiments. Once any heavier particles have settled, the treated effluent 456 then exits the system 411 at the top of stilling compartment 419 through outlet port 425.

Two features of this embodiment of the present invention are (1) the maintenance of a high level of oxygen content in two of the compartments (trash tank 413 and mix liquor compartment 417), and (2) the virtually complete elimination of sludge in mix liquor compartment 417. Because of these significant advantages, the overall size of system 411 is much smaller than conventional wastewater processing and treatment devices. The tank 414 of system 411 has a height of approximately 46 inches, and a height of approximately 50 inches when measured to the top of the ports 412. This depth is approximately 36 inches less than conventional units and offers a significant savings in earth excavation costs.

Figure 6:
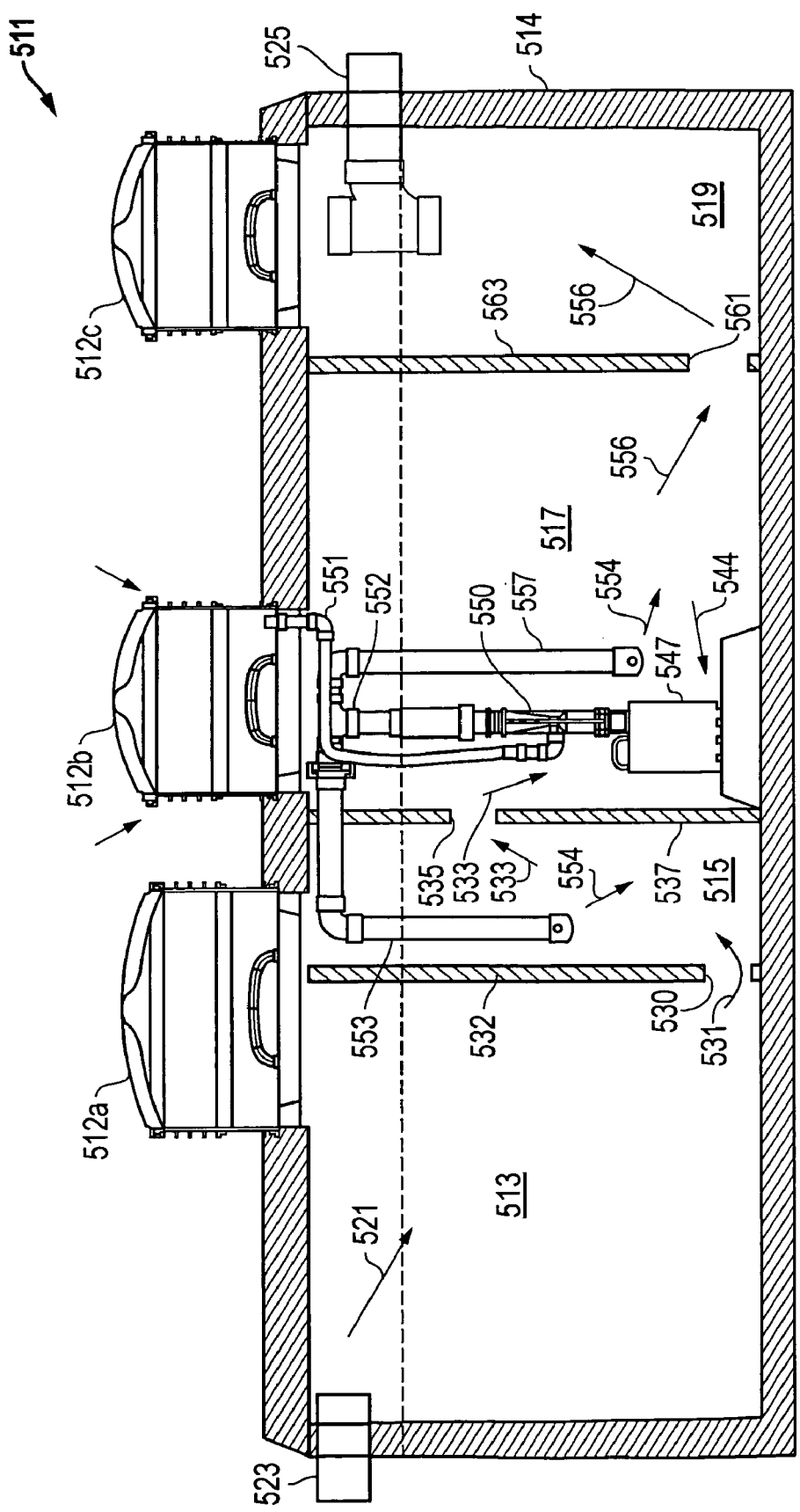
FIG. 6 is a sectional side view of another embodiment of an aerobic wastewater management system constructed in accordance with the present invention.

Referring now to FIG. 6, another embodiment of an aerobic wastewater management system 511 constructed in accordance with the present invention is shown. System 511 comprises a generally rectangular tank having four compartments 513, 515, 517, 519. Each compartment is separated by walls or partitions that are located within the tank. Three resealable risers or access ports 512a, b, c are located on top of the tank. Port 512a provides access to compartments 513 and 515, port 512b provides access to compartment 517, and port 512c provides access to compartment 519. Wastewater or sewage, indicated by arrow 521, enters system 511 at entry port 523 in a conventional manner and generally flows from left to right as it is processed and bio-nutrients are removed, until reclaimed water is produced and exits system 511 at exit port 525. The discharge is then distributed in a conventional manner.

As wastewater 521 enters system 511 via attached plumbing (not shown), it contains both organic matter and human waste, which is also known as effluent. The untreated effluent is deposited through entry port 523 directly into the first compartment, or trash tank 513. In trash tank 513, the effluent is initially processed and broken down into suspended solids and liquids, which are partially digested by aerobic bacteria (not shown). Aerobic bacteria, rather than the much slower acting anaerobic bacteria, are used to break down and digest the waste.

The separated sewage (indicated by arrow 531) from trash tank 513 migrates and enters into the second compartment, which is a first settling compartment 515, via one or more openings 530 at the bottom of the first partition 532. In first settling compartment 515, all heavier solids settle out of the liquid and remain in compartment 515. These solids then continue to undergo digestion by the aerobic bacteria located in compartment 515. The lighter solids, which are still suspended in the liquid (indicated by arrow 533), exit compartment 515 through an opening 535 located near the middle of the second partition 537, but submerged in the liquid.

Liquids 533 flows through opening 535 into the third compartment, or the mix liquor compartment 517, where it is drawn downward toward a pump 547. A base pipe with optional apertures (described above for previous embodiments) may be used as well. The design of this intake system contributes to prevent an accumulation of sludge at the bottom of mix liquor compartment 517, such that only a very small residual amount of sludge (approximately 2% or less by volume of the mix liquor compartment, in one embodiment) is ever present in mix liquor compartment 517.

The pump 547 (e.g., a centrifugal pump) is located near the bottom of mix liquor compartment 517. Pump 547 draws in liquids 533, and liquids and suspended solids (indicated by arrows 544) from the bottom of mix liquor compartment 517. The contents 544 of mix liquor compartment 517 circulate up through pump 547. Pump 547 circulates the liquids and suspended solids 533, 544 through an aeration device 550, such as a venturi aeration device. Air is thoroughly blended into the liquid and suspended solids to produce oxygenated effluent (indicated by arrows 554). An air intake device 551 is provided for supplying oxygen to the aeration device 550. The air intake device 551 may comprise a hose that extends from port 512b down to aeration device 550 to provide air that has been drawn from the ambient atmosphere outside of system 511.

The oxygenated effluent 554 of suspended solids, liquid, and air, also known as aerated precipitate, flows out of aeration device 550 into a pipe 552. A portion (approximately 30%, in one embodiment) of the oxygenated effluent 554 is discharged into settling compartment 515 via a conduit 553. The introduction of air into settling compartment 515 via conduit 553 facilitates the growth of aerobic bacteria that digests organic solids, as described above.

The bulk of the oxygenated effluent 554 flowing through pipe 552 (which was not discharged into settling compartment 515) is discharged back into the mix liquor compartment 517 through a conduit 557. The introduction of air into compartment 517 via conduit 557 facilitates the growth of aerobic bacteria that digests organic material, again virtually eliminating the presence of sludge in compartment 517. In one embodiment, the ends of both conduits 553, 557 are capped but have a plurality of small nozzles to discharge the oxygenated effluent 554 into their respective compartments 513, 517.

All of the liquid and suspended solids in mix liquor compartment 517 are continuously pulled into pump 547 from compartment 517 and circulated with air from the air intake device 551, thereby blending with air several times per hour. This process of mixing aerobic bacteria, air, and effluent increases the bacterial digestion of the organic solids. By drawing the liquid and solids from compartment 517 and aerating them, the build-up of sludge in compartment 517 is eliminated.

After being processed through trash tank 513, first settling compartment 515, and mix liquor compartment 517, the biological oxygen demand (BOD) and total suspended solids (TSS) in the solution or treated effluent (indicated by arrow 556) have been reduced to a level that is safe for discharge from system 511. The treated effluent 556 flows from the bottom of compartment 517, through an opening 561 in partition 563, and into a second settling compartment or stilling compartment 519. If any heavy particles remain in the liquid, they will settle out in this compartment, which, optionally, may be provided with an incline (not shown) as described above for the previous embodiments. Once any heavier particles have settled, the treated effluent 556 then exits the system 511 at the top of stilling compartment 519 through outlet port 525.

Two features of this embodiment of the present invention are (1) the maintenance of a high level of oxygen content in two of the compartments, and (2) the virtually complete elimination of sludge in mix liquor compartment 517. Because of these significant advantages, the overall size of system 511 is much smaller than conventional wastewater processing and treatment devices. The tank of system 511 has a height of approximately 46 inches, and a height of approximately 50 inches when measured to the top of the ports 512. This depth is approximately 36 inches less than conventional units and offers a significant savings in earth excavation costs.

Figure 7:
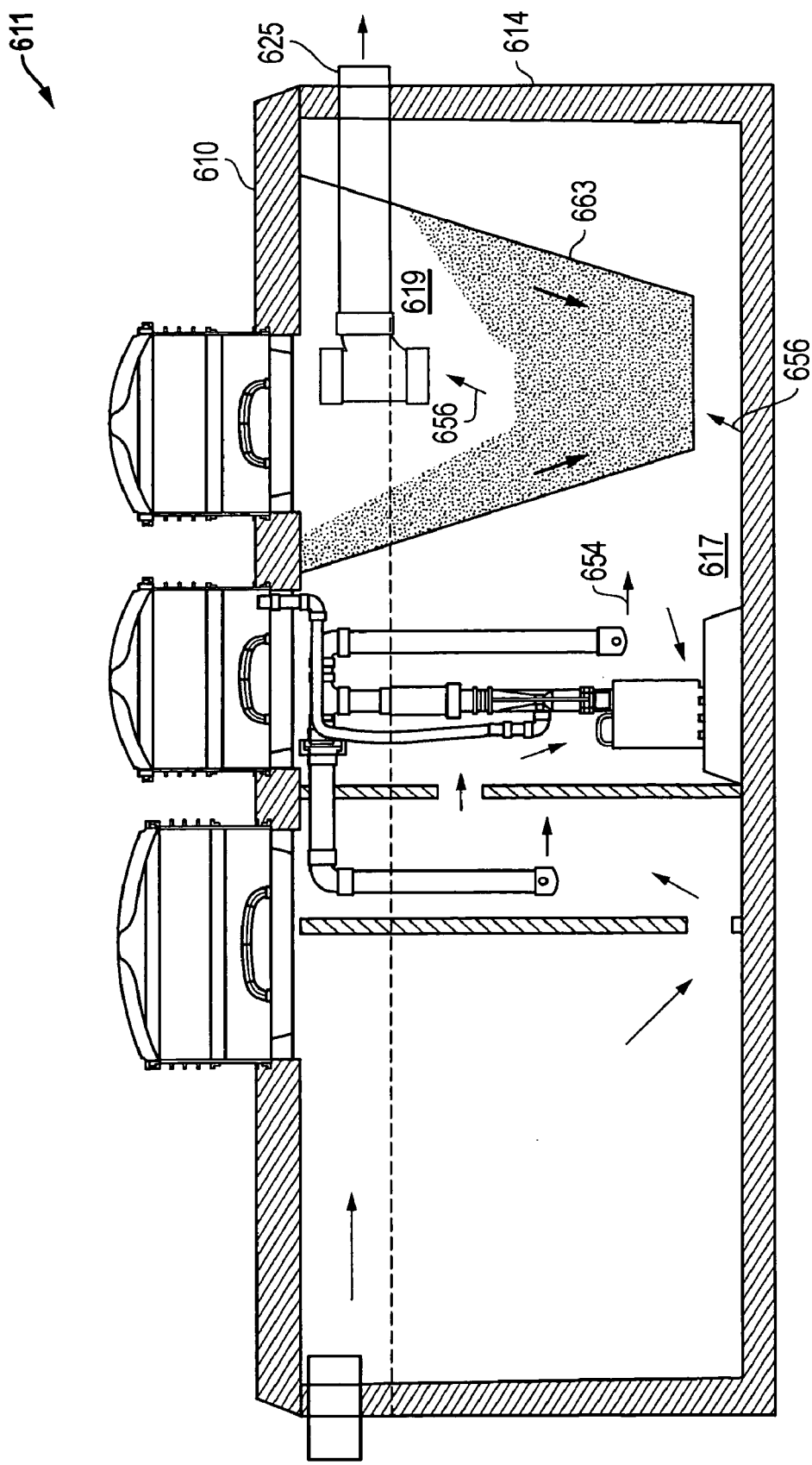
FIG. 7 is a sectional side view of yet another embodiment of an aerobic wastewater management system constructed in accordance with the present invention.

Referring now to FIG. 7, still another embodiment of an aerobic wastewater management system 611 constructed in accordance with the present invention is shown. System 611 is very similar to system 511 (FIG. 6), except that the partition 563 in system 511 is replaced by a funnel 663 (e.g., a conical funnel) in system 611. In the embodiment shown, funnel 663 extends from the bottom of lid 610 to near the bottom of mix liquor compartment 617. Every other component of system 611 is substantially identical to those described above for the previous embodiment.

The interior of funnel 663 forms a stilling compartment 619. Exit port 625 extends from an exterior of tank 614 to stilling compartment 619. As described above, air is thoroughly blended into the liquid and suspended solids to produce oxygenated effluent (indicated by arrows 654). The oxygenated effluent circulates up through an opening at the bottom of funnel 663 into stilling compartment 619, where the biological oxygen demand (BOD) and total suspended solids (TSS) in the solution or treated effluent (indicated by arrow 656) have been reduced to a level that is safe for discharge from system 611. If any heavy particles remain in the liquid, they will settle out in stilling compartment 619. Once any heavier particles have settled, the treated effluent 656 then exits the system 611 near the top of stilling compartment 619 through outlet port 625.

The present invention has several advantages. A wastewater processing and treatment system constructed in accordance with the present invention utilizes aerobic bacteria in two separate compartments to break down and digest waste. This system is much more efficient than those that use the much slower acting anaerobic bacteria. The first settling compartment is non-existent on other conventional aerobic units. The first settling compartment allows for settling of heavy particles and keeps floating debris out of the circulating pump that is located in the mix liquor compartment. In the mix liquor compartment, 100% of the liquid, in one embodiment, is blended with air several times per hour, again tremendously increasing the efficiency and performance of the overall unit. The intakes on the horizontal base pipe at the bottom of the mix liquor compartment allow the pump to remove sludge build-up, which is a significant problem on all other conventional aerobic treatment units. In addition, the spin filter removes all particles larger than 200 microns from the mix liquor compartment. No particles of a significant size can remain in this compartment without being filtered and blended with air.

As the effluent is blended with air, oxygen is separated from the other gases in the air. Oxygen, being heavier than H20, settles to the bottom of the tank. This concentration of oxygen, as high as 90% dissolved, in one embodiment, inhibits the development of sludge at the bottom of the tank. Sludge is generally made of organic particles that settle to the bottom and anaerobic bacteria. The oxygen present in the bottom of the tank allows the aerobic bacteria to multiply and consume the organic particles and the anaerobic bacteria. Therefore the present aerobic unit will have a minimal amount of sludge build up.

While the invention has been shown or described in only some of its forms, it should be apparent to those skilled in the art that it is not so limited, but is susceptible to various changes without departing from the scope of the invention. For example, the components and features described for each embodiment may be used interchangeably between and/or added to the other embodiments. Moreover, some elements of the present invention may be relocated to different compartments and, in some embodiments, may be located external to the tank.

What is claimed is:

1. A septic tank having side walls, a bottom, a top, an inlet port for receiving effluent, and an outlet port for discharging treated effluent, the septic tank comprising:

a trash tank adapted to receive the effluent from the inlet port and process and break down the effluent into suspended solids and liquids such that they are partially digested by aerobic bacteria to form a separated sewage;

a mix liquor compartment;

a first stilling compartment located between the trash tank and the mix liquor compartment;

a pump located in the mix liquor compartment, the pump being adapted to receive solids suspended in the liquids from the mix liquor compartment to resist accumulation of sludge in the mix liquor compartment;

an aeration device in communication with the pump, such that the pump circulates the liquids and suspended solids through the aeration device to thoroughly blend air into the liquids and suspended solids to produce oxygenated effluent;

an apparatus adapted to deliver oxygenated effluent from the aeration device to the mix liquor compartment and the first stilling compartment to facilitate the growth of aerobic bacteria therein, and significantly reduce the presence of sludge in the mix liquor compartment, such that a biological oxygen demand and total suspended solids in the treated effluent have been reduced to a level that is safe for discharge from the system; and a stilling compartment adapted to receive the treated effluent from the mix liquor compartment and settle out any heavy particles that remain in the liquids, and to allow the treated effluent to exit the system through the outlet port of the tank.

2. The septic tank of claim 1, wherein the first settling compartment is adapted to receive the separated sewage from the trash tank such that, in the first settling compartment, any heavier solids settle out of the liquids and remain in the first settling compartment and continue to undergo digestion by the aerobic bacteria located in the first settling compartment.

3. The septic tank of claim 1, wherein the trash tank, first settling compartment, and mix liquor compartment are separated by partitions having openings for permitting liquids to flow therethrough.

4. The septic tank of claim 1, wherein a residual amount of sludge in the mix liquor compartment comprises approximately 2% or less, by volume, of the mix liquor compartment.

5. The septic tank of claim 1, wherein the pump comprises centrifugal pump that is located inside and near a bottom of the mix liquor compartment.

6. The septic tank of claim 1, wherein the stilling compartment comprises a funnel that extends from the top down in to the mix liquor compartment, the funnel having an opening at a lower end for permitting flow of liquids into the funnel.

7. The septic tank of claim 1, wherein approximately 30% of the oxygenated effluent is discharged into the first settling compartment, and a remainder of the oxygenated effluent is discharged into the mix liquor compartment.

8. The septic tank of claim 1, wherein all of the liquids and suspended solids in the mix liquor compartment are continuously pulled into the pump from a bottom of the mix liquor compartment and blended with air several times per hour to increase the bacterial digestion of organic solids.

9. The septic tank of claim 1, wherein as the effluent is blended with air, oxygen is separated from the other gases in the air, and the oxygen settles to a bottom of the tank, whereby a concentration of oxygen, as high as 90% dissolved, inhibits the development of sludge at the bottom of the tank.

10. The septic tank of claim 1, wherein the septic tank has a height of less than four feet.

11. An aerobic wastewater management system, comprising:
a tank having an inlet port for receiving effluent, a plurality of compartments located inside the tank for processing and treating effluent and removing bio-nutrients therefrom, and an outlet port for discharging treated effluent; the compartments further comprising:
a trash tank for receiving the effluent from the inlet port and processing and breaking down the effluent into suspended solids and liquids such that they are partially digested by aerobic bacteria to form a separated sewage;

a first settling compartment for receiving the separated sewage from the trash tank such that, in the first settling compartment, any heavier solids settle out of the liquids and remain in the first settling compartment and continue to undergo digestion by the aerobic bacteria located in the first settling compartment;

a mix liquor compartment having a pump, an aeration device in communication with the pump, the pump receiving any lighter solids suspended in the liquids from the first settling compartment, and liquids and suspended solids from the mix liquor compartment to resist accumulation of sludge in the mix liquor compartment, such that the pump circulates the liquids and suspended solids through the aeration device to thoroughly blend air into the liquids and suspended solids to produce oxygenated effluent;

a pipe extending from the aeration device for delivering oxygenated effluent into both the first settling compartment and into the mix liquor compartment to facilitate the growth of aerobic bacteria therein, and significantly reduce the presence of sludge in the mix liquor compartment, such that a biological oxygen demand and total suspended solids in the treated effluent have been reduced to a level that is safe for discharge from the system; and a stilling compartment for receiving the treated effluent from the mix liquor compartment and settling out any heavy particles that remain in the liquids, and allowing the treated effluent to exit the system through the outlet port of the tank.

12. The system of claim 11, wherein the trash tank, first settling compartment, and mix liquor compartment are separated by partitions having openings for permitting liquids to flow therethrough.

13. The system of claim 11, wherein the stilling compartment comprises a funnel that extends from the top down in to the mix liquor compartment, the funnel having an opening at a lower end for permitting flow of liquids into the funnel.

14. A method of managing wastewater with aerobic bacteria, comprising:
receiving effluent and processing and breaking down the effluent into suspended solids and liquids such that they are partially digested by aerobic bacteria to form a separated sewage;

receiving the separated sewage such that any heavier solids settle out of the liquids and continue to undergo digestion by the aerobic bacteria;

receiving any lighter solids suspended in the liquids and delivering the lighter solids suspended in the liquids along with liquids and suspended solids from a mix liquor compartment to resist accumulation of sludge in the mix liquor compartment;

pumping and aerating the liquids, lighter solids, and suspended solids to produce oxygenated effluent;

delivering oxygenated effluent into the mix liquor compartment and a first settling compartment to facilitate the growth of aerobic bacteria therein, and significantly reduce the presence of sludge in the mix liquor compartment, such that a biological oxygen demand and total suspended solids in the treated effluent have been reduced to a level that is safe for discharge from the system; and receiving the treated effluent from the mix liquor compartment and settling out any heavy particles that remain in the liquids; and then discharging treated effluent.

15. The method of claim 14, wherein the liquids and suspended solids from the mix liquor compartment are drawn from a floor of the mix liquor compartment and from the first settling compartment.

16. The method of claim 14, wherein the pumping and aerating step comprises aerating with a venturi aeration device.

17. The method of claim 14, wherein the delivering step comprises delivering approximately 30% of the oxygenated effluent into the first settling compartment, and a remainder of the oxygenated effluent into the mix liquor compartment.

18. The method of claim 14, wherein all of the liquids and suspended solids in the mix liquor compartment are continuously pulled from a bottom of the mix liquor compartment and blended with air several times per hour to increase the bacterial digestion of organic solids.

19. The method of claim 14, wherein as the effluent is blended with air, oxygen is separated from the other gases in the air and a concentration of oxygen, as high as 90% dissolved, inhibits the development of sludge.

20. The method of claim 14, wherein the receiving step comprises drawing the treated effluent up into a funnel prior to discharge.

* * * * *